United States Patent
McLean et al.

(10) Patent No.: US 9,800,075 B2
(45) Date of Patent: Oct. 24, 2017

(54) SMART CHARGING CABLE AND METHOD FOR OPERATING A PORTABLE ELECTRONIC DEVICE

(71) Applicant: Societe BIC, Clichy (FR)

(72) Inventors: Gerard F. McLean, West Vancouver (CA); Jean-Louis Iaconis, Burnaby (CA)

(73) Assignee: Societe BIC, Clichy (FR)

( * ) Notice: Subject to any disclaimer, the term of this patent is extended or adjusted under 35 U.S.C. 154(b) by 678 days.

(21) Appl. No.: 14/295,789

(22) Filed: Jun. 4, 2014

(65) Prior Publication Data

US 2015/0357834 A1    Dec. 10, 2015

(51) Int. Cl.
*H02J 7/00* (2006.01)
*H02M 3/04* (2006.01)
*H02J 1/00* (2006.01)

(52) U.S. Cl.
CPC ............... *H02J 7/007* (2013.01); *H02J 1/00* (2013.01); *H02J 7/0054* (2013.01); *H02J 7/0055* (2013.01); *H02M 3/04* (2013.01); *H02J 2007/0062* (2013.01); *Y10T 307/406* (2015.04)

(58) Field of Classification Search
CPC ...................................................... H02J 7/007
USPC ........................................................... 307/31
See application file for complete search history.

(56) References Cited

U.S. PATENT DOCUMENTS

| | | | |
|---|---|---|---|
| 5,622,518 A | 4/1997 | Kalpaxis | |
| 8,457,153 B2 | 6/2013 | Nguyen et al. | |
| 8,534,931 B2 | 9/2013 | Miller | |
| 2005/0057225 A1 | 3/2005 | Marquet | |
| 2005/0276547 A1 | 12/2005 | Wang et al. | |
| 2007/0073420 A1* | 3/2007 | Lanni | H02J 1/00 700/22 |
| 2013/0043827 A1 | 2/2013 | Weinstein et al. | |
| 2013/0318385 A1 | 11/2013 | Miller | |

FOREIGN PATENT DOCUMENTS

| | | |
|---|---|---|
| CN | 201251757 Y | 6/2009 |
| CN | 202225745 U | 5/2012 |
| JP | 2001069165 A | 3/2001 |
| JP | 2001117676 A | 4/2001 |
| JP | 2008103196 A1 | 5/2008 |
| JP | 2008305148 A | 12/2008 |
| JP | 201384083 A | 5/2013 |
| KR | 20040025400 A | 3/2004 |

(Continued)

OTHER PUBLICATIONS

International Search Report and Written Opinion issued in connection with corresponding International Application No. PCT/EP2015/061968 on Sep. 21, 2015.

(Continued)

*Primary Examiner* — Joseph Chang
(74) *Attorney, Agent, or Firm* — The H.T. Than Law Group

(57) ABSTRACT

A smart charging cable and a method of operating the cable are disclosed. The cable can analyze any input voltage to determine whether the input voltage is sufficient to charge the battery of an electronic device and/or to operate the electronic device. If not, the cable is capable of transforming the input voltage to a voltage sufficient to charge and/or operate.

15 Claims, 5 Drawing Sheets

(56) References Cited

FOREIGN PATENT DOCUMENTS

| KR | 20050023556 A | 3/2005 |
|----|---------------|--------|
| KR | 20080007018 A | 1/2008 |
| WO | 2005006466 A2 | 1/2005 |
| WO | 2012153890 A1 | 11/2012 |

OTHER PUBLICATIONS

Machine translation of JP 2008103196 A to Shin Kobe Electric Machinery.
Translated Abstract of JP 201384083 to Force Media Inc.
Machine Translation of JP 2008305148 to Sumi.
Machine Translation of CN 2022225745 U to Zhiwei.
"USB". www.wikipedia.org/wiki/usb.
"Generator Solar Laptop Charger". www.voltaicsystems.com/generator.
"USB Port Protection". www.bourns.com. 2009.
Translated Abstract of JP 2001069165 A to Koura.
Machine translation of KR 2004-0025400 to Ryu.
Machine Translation of KR 2008-0007018 to Lee.
Machine Translation of CN 201251757Y.
Machine translation of JP 201117676 to Sugimoto.
Van Beneden, Bruno. "Varistors: Ideal Solution to Surge Protection". Power Electronics Tehnology. May 2003. www.powerelectronics.com.
Machine Translation of KR 20050023556A to Yang.

* cited by examiner

SMART CHARGING CABLE AND METHOD FOR OPERATING A PORTABLE ELECTRONIC DEVICE

FIELD OF THE INVENTION

The invention pertains broadly to a method and apparatus for powering and/or charging a portable electronic device that employs a voltage transformation smart cable to connect the portable electronic device to any electrical power source to charge or power the portable electronic device. The voltage transformation smart cable includes circuitry for analyzing the voltage from the electrical power source and determining whether the voltage can directly power and/or charge the portable electronic device or whether the voltage should be transformed before charging.

BACKGROUND OF THE INVENTION

In recent years, the use of Universal Serial Bus (USB) technologies has blossomed in many different portable consumer devices such as laptops, tablets, Ipod® devices, cell phones, smart phones, smart watches, handheld game consoles, portable media players, digital cameras and DVD players, and other mobile devices. All of these devices require electricity to power them and, typically, these devices are provided with an internal rechargeable battery that provides the required operative voltage and current. USB cables can be used to facilitate charging the battery within the portable consumer electronic devices from external power sources, as well as to transport data between devices.

Devices for recharging the internal rechargeable batteries of such portable consumer devices include wall chargers, disposable or rechargeable battery chargers, power banks, fuel cell chargers, wind powered chargers and solar powered chargers. However, each of these battery recharging systems includes multiple components and have certain drawbacks.

For instance, a wall charger typically includes a plug for a wall socket, an AC-DC converter, and a cable with a USB plug for plugging into the USB port of the target mobile device that requires recharging. Thus, the wall charger converts AC voltage from a wall socket to DC voltage that is suitable for powering a mobile device and/or recharging the mobile device. The main draw backs with a wall charger are that one must have access to an AC wall socket in order to recharge and that during the recharge the consumer electronic device is tethered to the wall losing its mobility.

Recharging systems that have greater plug independence include disposable or rechargeable battery charging systems, power bank charging systems and fuel cell charging systems. Such charging systems may be characterized as "depleting power sources" because they typically are provided with a maximum fuel amount or electrical energy charge that is transferred to the batteries being recharged. Batteries in a battery charging system may not hold sufficient power to fully charge a smart phone or a computer tablet, and have relatively short shelf lives. Power bank modules need to be recharged before they can recharge mobile devices. A fuel cell charging system may recharge mobile electronic devices with a USB cable. Fuel cell systems require fuels such as hydrogen or methanol to convert to electricity. Fuel cell systems are improvements over chargers that require fresh batteries and chargers that have to be charged themselves before being useable, because fuel cells are reusable and only need fresh fuels. Examples of fuel cell chargers include but are not limited to BIC-040, BIC-130, P132 and P133.

However, there is a need for a "smart" or "universal" USB cable that can analyze the voltage of various recharging voltage sources, such as wall chargers, battery chargers, power bank chargers, and fuel cell chargers, and that can determine which type of voltage source is supplying the recharging voltage, and then transform the recharging voltage, as required, to meet the operative energy needs of mobile devices.

BRIEF SUMMARY OF THE INVENTION

The invention pertains to a smart charging cable and a method of operating the cable. The cable can analyze any input voltage to determine whether the input voltage is sufficient to charge the battery of an electronic device or to power the electronic device. If not, the cable is capable of transforming the input voltage to a voltage sufficient to charge.

The present invention is also related to a method of providing power to a device. This power may be used to operate or run the device or to charge the internal battery in the device or both.

One embodiment of the present invention relates to a method for providing power to an electronic device, comprising the steps of:

(a) electrically connecting a cable to the electronic device and to an electrical power source so that the electrical power source charges a battery associated with the electronic device or provides power to the electronic device via the cable;

(b) analyzing a first voltage of the power source with an analyzing circuitry located on the cable; and (c) dependent on a result from step (b) transforming the first voltage to a second voltage sufficient to charge the battery or to operate the electronic device.

When the result from step (b) shows that the first voltage is a DC current and is below the level sufficient to charge the battery, the first voltage is transformed up to the second voltage. When the result from step (b) shows that is the first voltage is a DC current and is above the level sufficient to charge the battery and comprises a DC current, the first voltage is transformed down to the second voltage. When the result from step (b) shows that the first voltage comprises an AC current, the first voltage is transformed to a DC current and said transformed DC current is re-analyzed by step (b). When the result from step (b) shows that the first voltage is sufficient to charge the battery and the first voltage charges the battery without being transformed.

Another embodiment of the present invention relates to a smart cable comprising a cable having an input end and an output end and an analyzing assembly electrically connected to the cable between the input end and the output end. The analyzing assembly includes a voltage analyzing circuit disposed to analyze a first voltage supplied to the input end of the cable, at least one electrical converter to transform the first voltage to a second voltage sufficient to charge a battery of an electronic device or to power the electronic device, and a bypass circuit. The second voltage is supplied to the output end of the cable. When the first voltage is sufficient to charge the battery or to power the electronic device, the first voltage is directed to the bypass circuit to charge the battery or to power the electronic device, and when the first voltage is not sufficient to charge the battery the first voltage is transformed to the second voltage by the at least one electrical converter to charge the battery or to power the electronic device.

The at least one electrical converter comprises a DC/DC converter, which can be a step-up or step-down converter, or an AC/DC converter. The voltage analyzing circuit may comprise an under voltage lock out device, a state of charge indicator connected to an operating switch and/or an energy storage device that is capable of charging the battery. The energy storage device may comprise a second battery or a capacitor that can power the electronic device or charges its battery in the absence of a power source.

Another embodiment of the present invention relates to a method for providing power to an electronic device, comprising the steps of:

(a) electrically connecting a cable to the electronic device and to an electrical power source so that the electrical power source charges a battery associated with the electronic device or provides power to the electronic device via the cable;

(b) analyzing a first voltage of the power source with an analyzing circuitry located on the cable;

wherein if the first voltage is less than a bypass voltage (c) transforming the first voltage to a bypass voltage with a converter to charge the battery and disabling a bypass circuit; and wherein if the first voltage is greater than the bypass voltage (d) disabling the converter and enabling the bypass circuit. In step (c) if the first voltage is less than an under voltage lock out then (e) disabling the bypass circuit and disabling the converter. The method may also comprise the step of (f) activating a battery check and disabling the converter and disabling the bypass circuit.

Another embodiment relates to a method for providing power to an electronic device, comprising the steps of:

(a) electrically connecting a cable to the portable electronic device and to an electrical power source so that the electrical power source charges a first battery associated with the electronic device or provides power to the electronic device via the cable;

(b) charging a second energy storage device and storing power in same;

(c) providing the stored power in the second energy storage device to the electronic device or charging the first battery with said stored power.

This method may have the optional steps of (d) analyzing a first voltage of the power source with an analyzing circuitry located on the cable; and (e) dependent on a result from step (b) transforming the first voltage to a second voltage sufficient to charge the battery or to operate the electronic device.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

Figure 1:
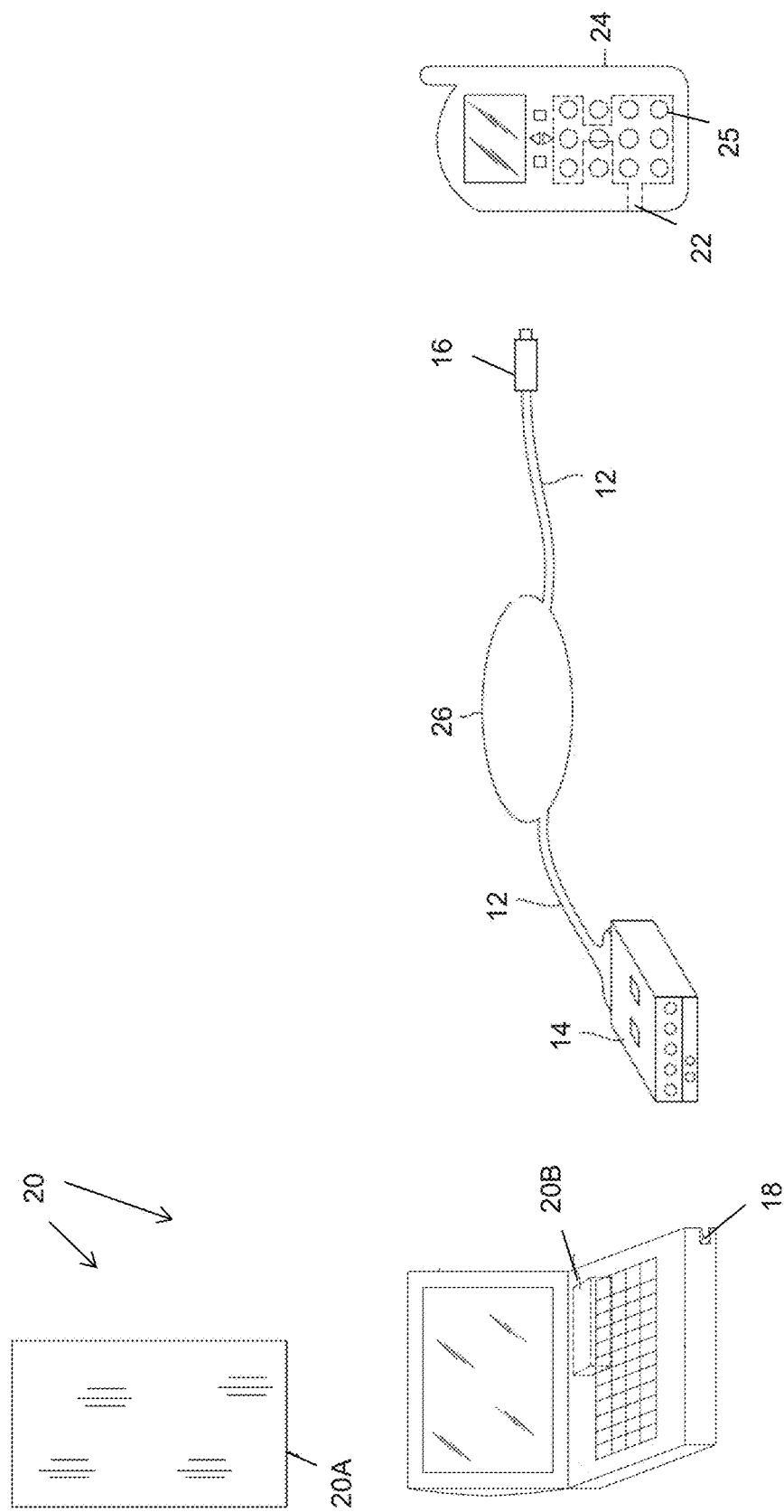
FIG. 1 illustrates a voltage transformation smart cable embodiment of the present invention.

The present invention is directed to a method and device for powering and/or charging the internal battery associated with a consumer electronic device. The present invention includes, but is not limited to, using a smart cable to transform the voltage and/or current from practically any charging power sources including depleting power sources to a voltage and/or current to charge the battery associated with consumer electronic devices or to power the consumer electronic devices. The charging power sources can be disposable or rechargeable battery chargers, power pack chargers, fuel cell systems, solar panels, manual-crank chargers. The inventive smart cable can determine the nature of the voltage and current of the charging power sources and intelligently decides whether the charging power source meets the operative requirements. If the charging voltage and current are within the operative range, then charging can proceed. If the charging voltage and current are not, then the smart cable decides the reasons why the voltage and current are not within the operative range and then transform the non-operative voltage and current to the operative range for charging.

Regardless of the input electrical power, the output power is in the range that is compatible or acceptable to the electronic device. The output power can be used to operate or run the electronic device or to charge/re-charge its internal battery, or both. While the descriptions herein discuss charging the electronic device's internal battery, it is understood that the output power from the inventive smart cable can be used to operate or run the electronic device.

In one example, both the battery to be charged and the charging power source are DC, but the voltage of the charging power source can be too high or too low, e.g., low voltage of a depleting battery. The smart cable can transform the high voltage to the operative voltage. This transformation can increase the current, which may improve the efficiency of the recharging. Without being bound to any particular theory, the present inventors believe that during a recharge the electrical power (P) losses in the cable are related to $I^2R$, where I is the current and R is the resistance. Hence, transferring power P at higher voltage V allows for a lower current I, which can reduce power losses. It is advantageous to locate the stepping-down DC/DC converter closer to the output end of the smart cable, so that lower power losses at higher voltage and lower current can occur in a longer length of the cable from the input end to the DC/DC converter, and higher power losses are limited to a relatively shorter length of cable from the DC/DC converter to the output end. Since power losses are related to the square of the current I, the location of the DC/DC stepping down converter along the smart cable closer to the output end can increase the charging efficiency or the power transfer efficiency. The smart cable can also transform the low voltage of a depleting battery using a DC/DC converter to a higher voltage preferably within the operative range to charge. While this transformation may decrease the current, but advantageously it utilizes the residual power in depleting power sources that otherwise would not be used. In another example, the battery to be charged requires DC voltage/current and the voltage and current of the charging power source is AC current. The smart cable would detect such AC current and then transform the charging voltage and current to DC. The inventive smart cable would then ascertain whether the transformed DC power is operative or not and take appropriate actions, discussed above.

In accordance with current mobile device technology, an operative voltage for charging a rechargeable battery of a portable electronic device is 5V±10.25 V supplied with a supply current of up to 500-1500 mA at this voltage, and a power of 2.5 Watts to 7.5 Watts. See, e.g., USB-IF, Battery Charging Specification, Revision 1.2, Oct. 12, 2011. It is noted that USB charging can occur and have occurred at current lower than 500 mA and at power less than 2.5 Watts. However, should the standards for operative voltage change in the future, the scope of the present invention should be construed to encompass it. In other words, the operative voltage of the present invention is not limited to the 5V employed by current standards pertaining to charging voltages for mobile devices. On the contrary, operative voltage pertains to the voltage required to effectively recharge a rechargeable battery of a mobile device regardless of any current or future changes in industry standards.

In accordance with one embodiment of the present invention, as shown in FIG. 1 a voltage transformation smart cable 10, which may be constructed as a cable with USB-type or other standardized or non-standardized ends, is provided and includes a flexible cable 12 provided with a standard type A male connector 14 on one end thereof (also referred to as the input end), and a standard type B male connector 16 on the other end thereof (also referred to as the output end). The standard type A male connector 14 is configured to matingly connect with a corresponding female connector 18 of an electrical charging power source or supply 20, and standard type B male connector 16 is configured to matingly connect with a corresponding female connector 22 of a portable electronic device 24, such as a laptop, a tablet, an Ipod, a cell phone, a smart phone, a smart watch, a handheld game console, a portable media player, a digital camera, and a DVD player, and like devices, which all may be characterized as "mobile devices" in accordance with the present disclosure. Thus, when standard type A male connector 14 is connected to female connector 18 of electrical power source 20, and standard type B male connector 16 is connected to female connector 22 of mobile device 24, then charging power source 20 is electrically connected to supply electrical energy to the mobile device so as to be able to recharge the rechargeable battery 25 of mobile device 24, or to directly power the mobile device 24. In accordance with the present disclosure, a "standard type A male connector" and a "standard type B male connector" include macro, mini and micro connectors. Furthermore, in accordance with the present invention, connectors 14 and 16 may also be other standard or non-standard connectors.

Charging power sources 20 can be battery chargers (disposable or rechargeable batteries), a power bank or pack, fuel cell chargers, solar chargers and hand-crank chargers, etc., illustrated by reference number 20A in FIG. 1. Charging power sources 20 can also be the internal battery 20B of another electronic device, such as laptops, computer tablets and desktops, which can be an AC or DC power source.

Smart cable 10 is provided with a charging or analyzing assembly 26 disposed between connectors 14 and 16, and that is electrically connected to connectors 14 and 16 via cable 12. The smart charging assembly 26 is provided with circuitry 28 and a processor 30 for determining whether the voltage generated by the power source 20 is an operative voltage, or a non-operative voltage.

Figure 2:
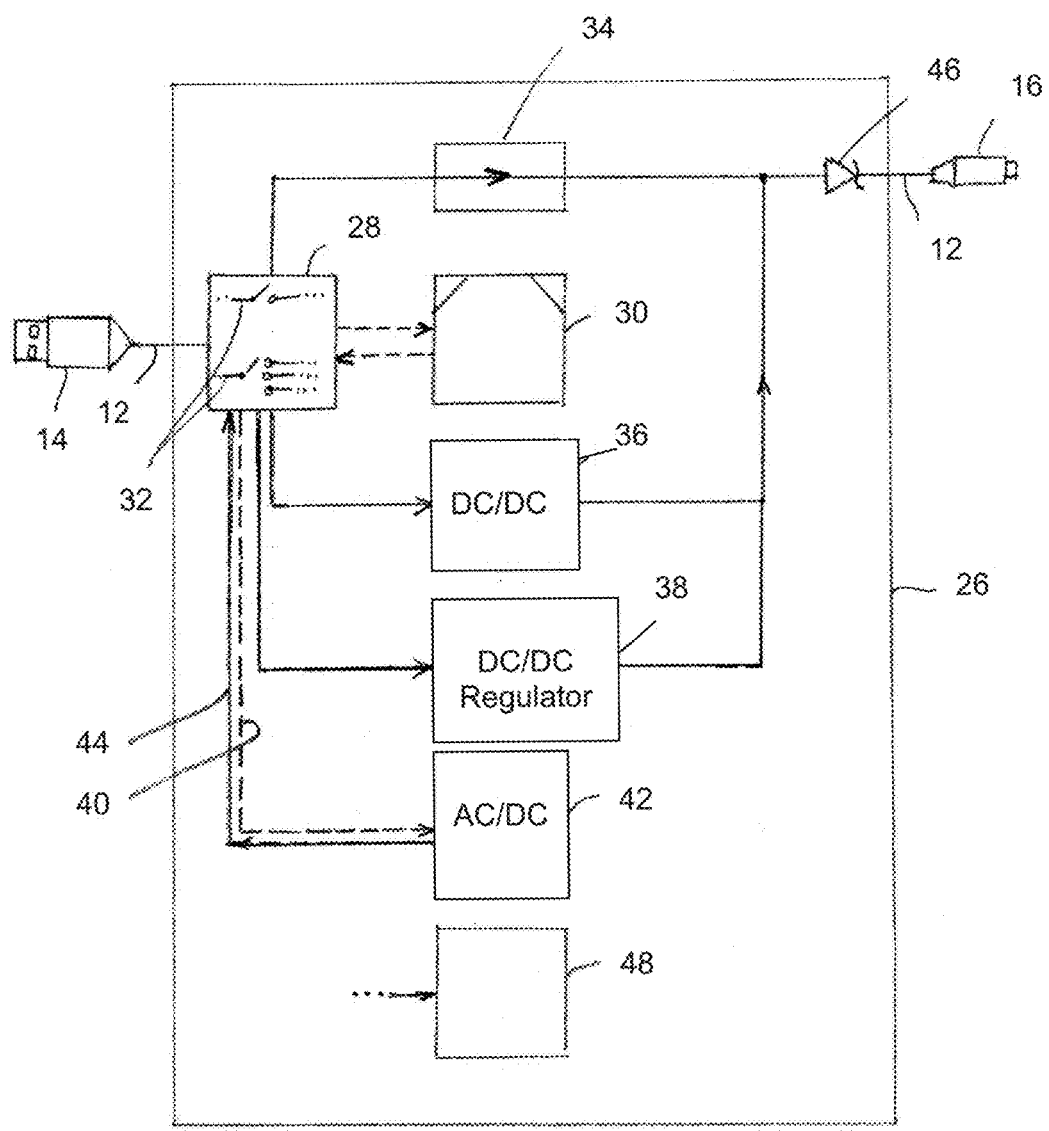
FIG. 2 is a schematic drawing of a charging or analyzing assembly of the inventive smart cable.

Referring to FIG. 2, charging assembly 26 comprises analyzing circuit 28 connected to processor or micro-processor 30. Although circuit 28 and processor 30 are illustrated as two separate components, they can be combined into a single component. Voltage analyzing circuit 28 receives voltage $V_{20}$ of the power supply 20. Processor 30 instructs analyzing circuit 28 to determine the characteristics of voltage $V_{20}$, i.e., whether the voltage is AC or DC, its amplitude, current and if applicable frequency. Circuit 28 may contain digital circuit and sensors, such as voltmeter(s) and amp meter(s) that can produce digital signals readable by processor 30. If voltage $V_{20}$ is operative to charge electronic device 24, e.g., 5V±0.25 V, 500-1500 mA and 2.5-7.5 Watts USB standard or at lower current and power discussed above, processor 30 moves switch 32 to connect $V_{20}$ to bypass 34 which directly connects $V_{20}$ to outlet connector 16 to charge device 24. In this configuration, cable 10 operates similar to a conventional USB charging cable. Although not specifically disclosed, cable 10 may also carry wires that in addition to transporting electrical power to charge may transmit signal, information or data similar to a USB cable.

If $V_{20}$ is not operative to charge device 24, then processor 30 may instruct circuit 28 to determine whether the $V_{20}$ is DC or AC. If $V_{20}$ is DC but its voltage is below the operative voltage, processor 30 may instruct switch 32 to connect $V_{20}$ to first DC/DC converter 36. DC/DC converter 36 is a step-up converter capable of increasing the voltage of $V_{20}$. DC/DC converters are electronic components or circuits that convert a DC current from one voltage to another voltage. Suitable DC/DC converters can be any type of converters including but not limited to linear regulators, electronic switch-mode converters, magnetic converters. Converter 36 preferably increases $V_{20}$ to an operative level that can charge device 24.

An advantage of using step-up DC/DC converters is that power source 20 can be depleting batteries. Power sources 20 may also include standard batteries and batteries that are manufactured with voltages that are out of desired voltages even before the first use and other non-standard batteries, e.g., not conforming to AA, AAA, C, D or rectangular 9V standards or the like. Non-conforming or non-standard batteries can be manufactured at lower costs. As batteries deplete, their voltages drop. When the voltages drop below the level that batteries 25 to be charged can accept, the depleting batteries can no longer be used even though they still contain power albeit at lower voltages. The depleting batteries are then discarded if they are disposable or potentially recharged if they are rechargeable. Smart cable 10 of the present invention can harvest the remaining or residual powers in the depleting disposable batteries prior to their disposal. Smart cable 10 maximizes the power output of batteries by minimizing the residual power that is typically discarded. In one example, laptop internal battery 20B may be depleted to a point where it may not be able to power the laptop computer but may contain sufficient residual power to at least partially charge a mobile or smart phone sufficient to place a phone call or to read e-mails/texts.

If $V_{20}$ is DC but its voltage is above the operative voltage, processor 30 may instruct switch 32 to connect $V_{20}$ to second DC/DC converter 38, which is a step-down converter. Converter 38 reduces the voltage of $V_{20}$ preferably to a level that can recharge device 24. Preferably, step-down converter 38 is known to those skilled in the art as a step-down buck converter, which in addition to reducing the voltage also increases the current. Buck converters are generally more efficient DC/DC switch converters than linear converters, which dissipate the power from the stepped down voltage as heat. Alternatively, the stepping-up and stepping-down functions can be performed by a single DC/DC converter. Single DC/DC converters that can perform the stepping-up (or boost) and stepping-down (buck) functions are commercially available and in certain embodiments are preferred.

If $V_{20}$ is AC, then controller 30 and/or circuit 28 sends the AC $V_{20}$ along line 40 (shown as a broken line in FIG. 2) to AC/DC converter 42. AC/DC converter 42 transforms the AC current to DC and resends the transformed DC current along line 44 back to circuit 28. Circuit 28 then repeats the inquiry of whether the DC current $V_{20}$ has the operative voltage to go to bypass 34 or to DC/DC converter 36 or DC/DC converter 38, as discussed above.

Optionally, a rectifier 46, such as a diode, is positioned between outlet connector 16 and the other components in charging assembly 26 to prevent or minimize current from reversing direction and leaving device 24 to go into smart cable 10 or back to charging power source 20, for example when power source 20 is a depleting power source. Charge assembly may also include other functional components, illustrated as element 48. The other functional components can be a diode to show that cable 10 is ON and functioning, or a display to show texts indicating that the system or cable 10 is charging or when charging is complete. The display can also convey an error message showing various reasons why charging cannot proceed or be completed. The display can also show a state of charge of power source 20 or battery 25 within device to be charged 24, or remaining charging time. Element 48 can also be low or under voltage lock out (UVLO), which may shut down electronic device 24 during recharging when the $V_{20}$ falls below the operating voltage of electronic device 24. The UVLO preferably shuts down charging assembly 26 when $V_{20}$ falls below a predetermined level. Element 48 can also be an energy storage device, such as a battery, a depleting battery or a capacitor, that stores energy optionally from a previous charge. In one embodiment, energy storage device 48 can charge battery 25 in electronic device 24 without power source 20. Power from storage device would be directed to analyzing circuit 28 and/or processor 30 to be analyzed and converted, if necessary, to charge battery 25.

Figure 3:
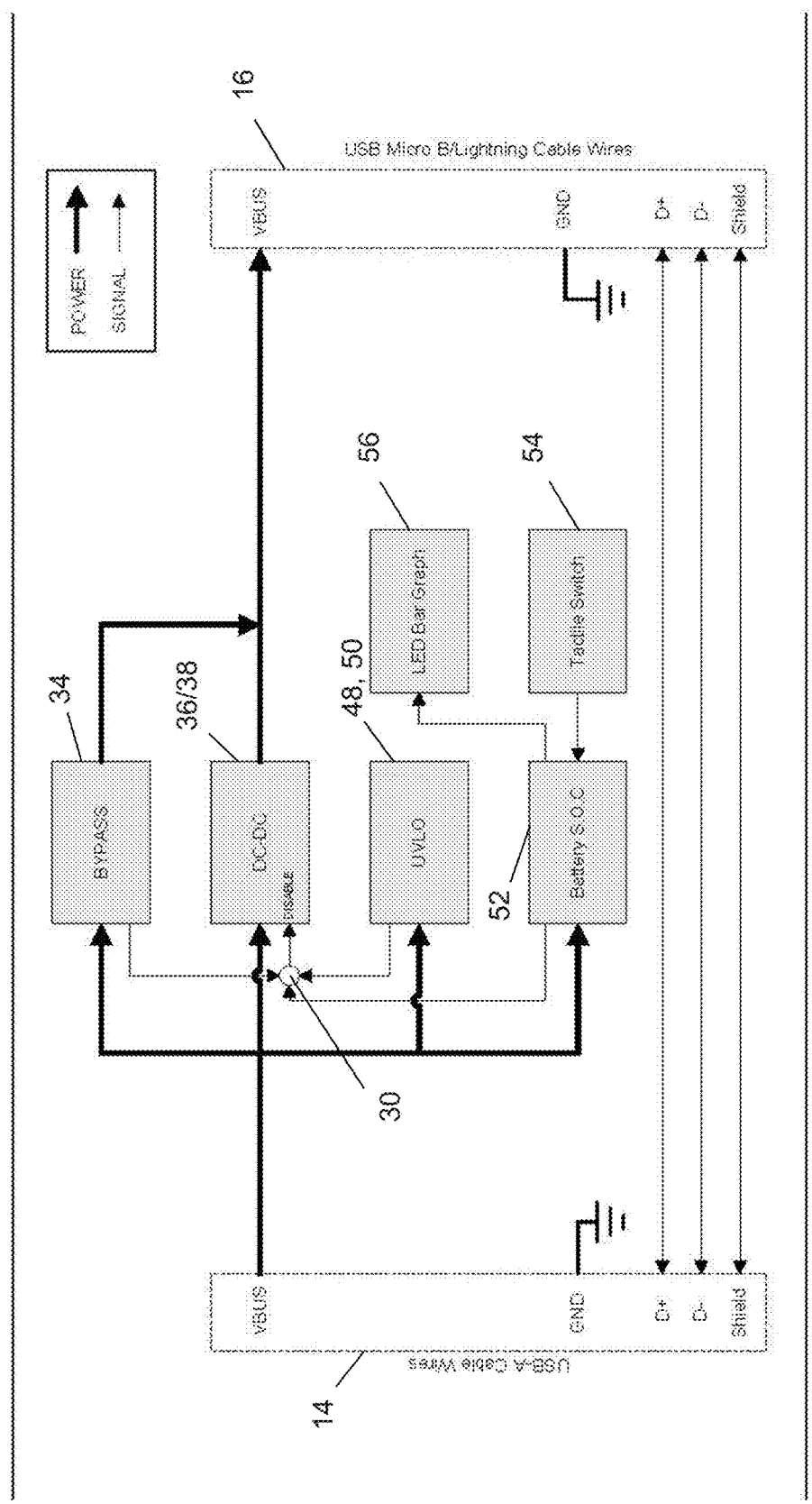
FIG. 3 is a schematic drawing of another charging or analyzing assembly of the inventive smart cable.

Referring to FIG. 3, another embodiment of charging assembly 26 is shown. In this embodiment, AC/DC converter is omitted for clarity and simplicity, and the path for power transmission (shown in bold solid lines) and for signal transmission (shown in light dotted lines) are distinguished. This charging assembly 26 also has controller 30 that can disable DC/DC converter 36/38, which in this embodiment is shown as a single unit. Bypass 34 is available to directly charge battery 25 in electronic device 24, when $V_{20}$ is operative to charge battery 25. Preferably, when bypass 34 is the charging circuit path the DC/DC converter is disabled. As discussed above, when $V_{20}$ is DC but is not operative to charge DC/DC converter 36/38 is enabled to step-up or to step-down the DC voltage in order to charge battery 25.

The embodiment in FIG. 3 also has an UVLO labeled as 50 to turn charging assembly 26 OFF when the charging $V_{20}$ is below a voltage $V_{UVLO}$. This embodiment also shows the state of charge (SOC) 52 of charging battery 20 or battery to be charged 25, or both, as well as the remaining charging time. Preferably, charging assembly 26 further comprises a tactile switch 54 that a user can push to activate SOC 52. A display, such as a LED bar graph 56 is electrically connected to SOC 52 to display the state of charge of source 20 or charging battery 25. Similar to the embodiment illustrated in FIG. 2, this embodiment may also have an energy storage device 48 added to the circuitry, as shown in FIG. 3, which can replace UVLO 50 or be employed in addition to UVLO 50.

It is noted and shown in the claims below that smart cable 10 may have energy storage device 48 independent of the other components in charging assembly 26. In other words, a simplified cable 10 may store power or energy in energy storage device 48 while power source 20 charges battery 25 or power device 24 without having or utilizing analyzing circuit 28, processor 30 or any of the converters 36, 38 or 42.

Preferably, charging assembly 26 has the capability to limit the input current to below a maximum current. Processor 30 preferably allows the charging at this maximum current and below; however, at charging current below the maximum current the charging time may increase. Preferably, the current limit and the UVLO each has a variable resistor which is programmable by controller 30 to vary the UVLO limit and/or the maximum current limit.

Figure 4:
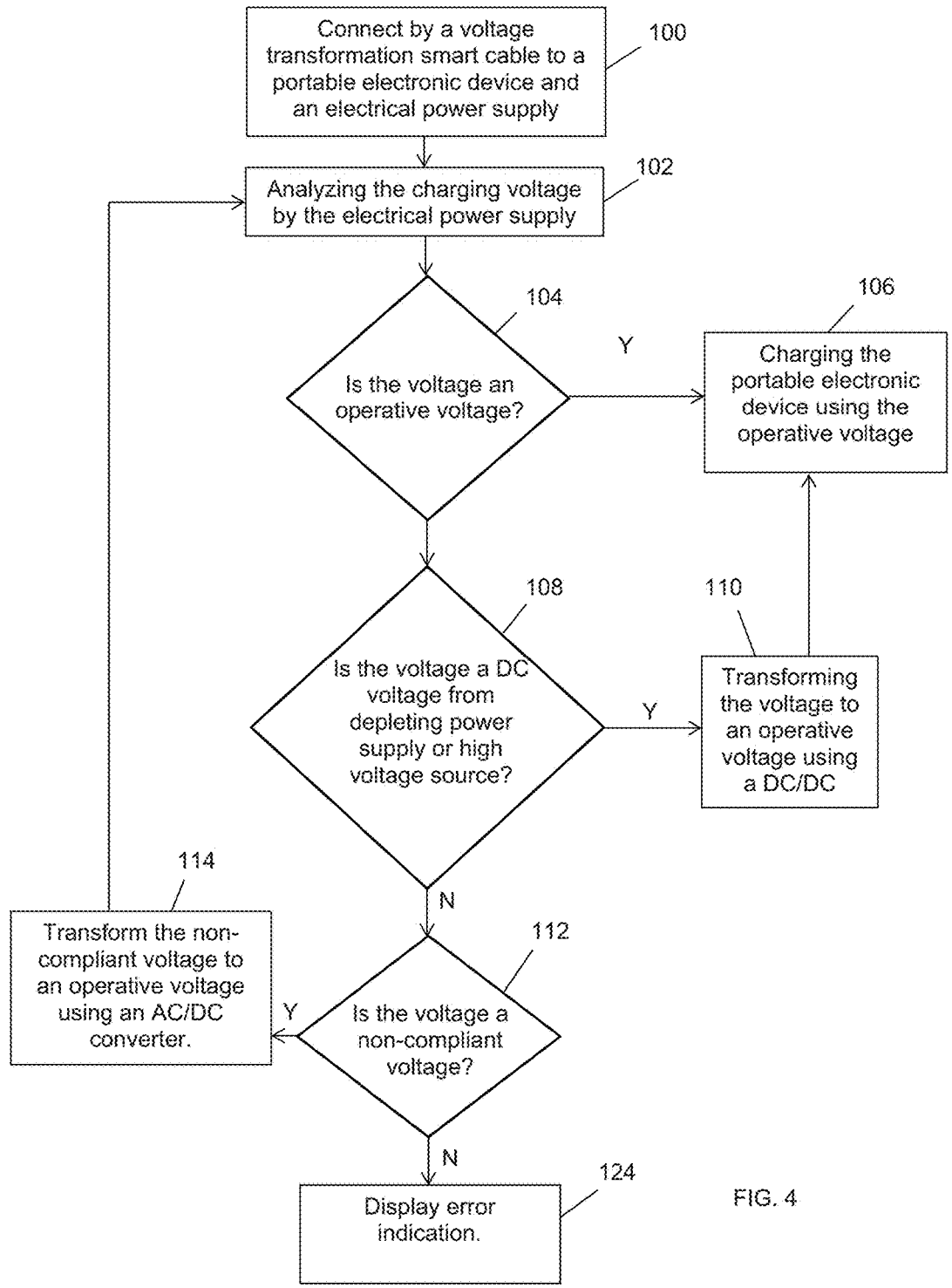
FIG. 4 is a flowchart outlining steps for a method for operating the embodiment shown in FIG. 2.

As shown in FIG. 4, an exemplary operating method for the embodiment of FIG. 2 is illustrated. At step 100, cable 10 is connected to power source 20 and electronic device 24 to charge battery 25. $V_{20}$ is analyzed at step 102. A decision of whether $V_{20}$ is within the operative voltage is made at step 104. If $V_{20}$ is operative, then charging assembly of cable 10 charges battery 25 of electronic device 24 in step 106. If $V_{20}$ is not within the operative range, then a decision whether $V_{20}$ is a DC current is made at step 108. It is noted that step 108 shows that both low DC voltage and high DC voltage can be detected at step 108, step 108 can be divided into two steps, i.e., determining low DC voltage and determining high DC voltage, separately. Low DC voltage and high DC voltage are relative terms determined relative to the operating voltage range.

If $V_{20}$ is a DC current, whether low or high, it is transformed in step 110 into the operative voltage range in step 110. As noted in FIG. 2, separate DC/DC converters 36 and 38 are used and as noted in FIG. 3, a unified DC/DC converter 36/38 is used. After step 110, the transformed DC current $V_{20}$ is used to charge battery 25 or to operate device 24, or both.

If $V_{20}$ is not a DC current, then at step 112 a decision is made whether $V_{20}$ is an AC current. If yes, then at step 114, the AC $V_{20}$ is transformed into DC current and then sent back to step 102 to determine whether the transformed $V_{20}$ can charge immediately or be transformed at step 110 to charge battery 25. Alternatively, the decisions at steps 108 and 112 can be made at one step and also the decisions at steps 104, 108 and 112 can be made at the same step. A switch or gate can be used to send $V_{20}$ to step 106, 110 or 114 to continue the process.

Figure 5:
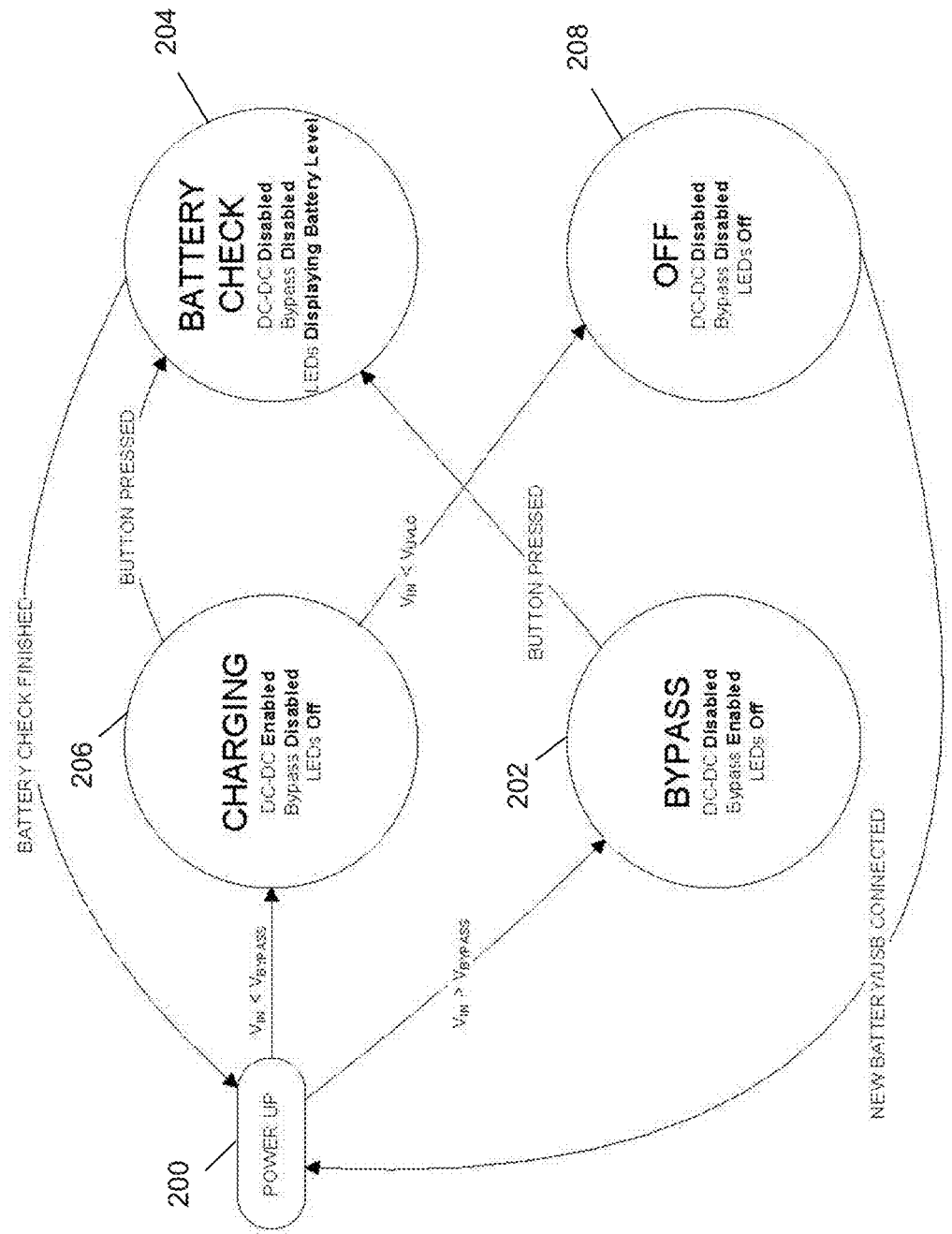
FIG. 5 is a flowchart outlining steps for another method for operating the embodiment shown in FIG. 3.

As shown in FIG. 5, an exemplary operating method for the embodiment of FIG. 3 is illustrated. At the power-up step 200, an analysis of the charging voltage $V_{20}$ is conducted. If $V_{20}$>the bypass voltage, i.e., within the operative voltage, then bypass 34 is activated at step 202 and the charging process begins. When switch 54 is pressed, a battery check step 204 is conducted. Preferably, both the DC/DC converter 36/38 and bypass 34 are disabled during the battery check. After the battery check is completed, the system may return to the initial power-up step 200 to restart.

If at power-up step 200 $V_{20}$ is less than the bypass voltage, then DC/DC converter 36 is activated while bypass 34 is disabled, as shown as step 206. Here, if switch 54 is pressed battery check step 204 is initiated and afterward the system returns to step 200. If the $V_{20}$ falls below $V_{UVLO}$, charging assembly 26 shuts down at step 208 until a new battery or power source 20 is attached to cable 10. At that time, the system starts up again at power-up step 100.

As mentioned above, power source 20 can be one or more solar power cells. Solar cells can produce DC currents; however, the DC current from the solar cells can vary significantly in voltage and current. Advantageously, DC/DC converters 36 and 38 can be employed alternatively to step the voltage up and down to ensure at the output power at connection end 16 remains substantially constant and compatible with device 24.

While various embodiments of the present invention have been described above, it should be understood that they have been presented by way of illustration and example only, and not limitation. It is specifically noted that component(s) from one embodiment can be incorporated into other embodiment(s). It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

We claim:

1. A method for providing power to an electronic device, comprising the steps of:
   (a) electrically connecting a cable to the electronic device and to an electrical power source so that the electrical power source charges a battery associated with the electronic device or provides power to the electronic device via the cable;
   (b) analyzing a first voltage of the power source with an analyzing circuitry located on the cable, wherein the voltage analyzing circuit further comprises an under voltage lock out device; and
   wherein if the result from step (b)
      (i) is that the first voltage is below the level sufficient to charge the battery and comprises a DC current then the first voltage is transformed up to the second voltage,
      (ii) is that the first voltage is above the level sufficient to charge the battery and comprises a DC current then the first voltage is transformed down to the second voltage,
      (iii) is that the first voltage comprises an AC current then the first voltage is transformed to a DC current and said transformed DC current is re-analyzed by step (b), or
      (iv) is that the first voltage is sufficient to charge the battery then the first voltage charges the battery without being transformed,
   wherein the under voltage lock out device shuts down the electronic device when the first voltage of the power source falls below an operating voltage of the electronic device.

2. The method of claim 1 further comprising the step (c) of charging a second storage device.

3. The method of claim 1 wherein the analyzing circuitry is located within the cable.

4. A method for providing power to an electronic device, comprising the steps of:
   (a) electrically connecting a cable to the electronic device and to an electrical power source so that the electrical power source charges a battery associated with the electronic device or provides power to the electronic device via the cable;
   (b) analyzing a first voltage of the power source with an analyzing circuitry located on the cable; wherein if the first voltage is less than a bypass voltage (c) transforming the first voltage to a bypass voltage with a converter to charge the battery and disabling a bypass circuit;
   wherein if the first voltage is greater than the bypass voltage (d) disabling the converter and enabling the bypass circuit, and
   wherein in step (c) if the first voltage is less than an under voltage lock out (e) disabling the bypass circuit and disabling the converter.

5. The method of claim 4, further including the step of (f) activating a battery check and disabling the converter and disabling the bypass circuit.

6. A smart cable comprising:
   (a) a cable having an input end and an output end; and
   (b) an analyzing assembly electrically connected to the cable between the input end and the output end, wherein the analyzing assembly includes
   a voltage analyzing circuit disposed to analyze a first voltage supplied to the input end of the cable, wherein the voltage analyzing circuit further comprises an under voltage lock out device;
   at least one electrical converter to transform the first voltage to a second voltage sufficient to charge a battery of an electronic device or to power the electronic device, wherein the second voltage is supplied to the output end of the cable; and
   a bypass circuit;
   wherein when the first voltage is sufficient to charge the battery or to power the electronic device the first voltage is directed to the bypass circuit to charge the battery or to power the electronic device, and wherein when the first voltage is not sufficient to charge the battery or to power the electronic device the first voltage is transformed to the second voltage by the at least one electrical converter to charge the battery or to power the electronic device.

7. The smart cable of claim 6, wherein the at least one electrical converter comprises a DC/DC converter.

8. The smart cable of claim 7, wherein the DC/DC converter is a step-up converter.

9. The smart cable of claim 7, wherein the DC/DC converter is a step-down converter.

10. The smart cable of claim 6, wherein the at least one electrical converter comprises an AC/DC converter.

11. The method of claim 6, wherein the second storage device is located within the cable.

12. The smart cable of claim 6, wherein the voltage analyzing circuit further comprises a state of charge indicator.

13. The smart cable of claim 12, wherein the voltage analyzing circuit further comprises an operating switch connected to the state of charge indicator.

14. The smart cable of claim 6 further comprising an energy storage device that is capable of charging the battery or to power the electronic device.

15. The smart cable of claim 14, wherein the energy storage device comprises a second battery or a capacitor.

* * * * *